UNITED STATES PATENT OFFICE 2,582,748

QUATERNARY AMMONIUM COMPOUNDS HAVING A HYDROXYBUTYNYL SUBSTITUENT

Willard J. Croxall, Bryn Athyn, and Sidney Melamed, Philadelphia, Pa., assignors to Rohm & Haas Company, Philadelphia, Pa., a corporation of Delaware No Drawing. Application January 4, 1951,
Serial No. 204,481

7 Claims. (Cl. 260—567.6)

This invention deals with quaternary ammonium compounds of the formula

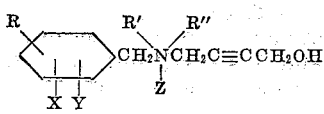

wherein R is an alkyl group of eight to sixteen carbon atoms, X and Y are hydrogen or methyl, R' and R'' are methyl or ethyl, and Z is a salt-forming anion. These compounds are distinguished by good bactericidal and fungicidal action and by the fact that they are not phytocidal when applied to living plants in dilute solutions.

These compounds are prepared by reacting 4-dimethylamino-2-butyne-1-ol or 4-diethylamino-2-butyne-1-ol,

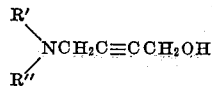

with an alkylbenzyl halide,

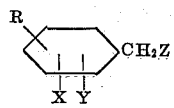

The reaction is effected by mixing these two components directly or in the presence of an organic solvent, such as benzene, toluene, isopropyl alcohol, isopropyl ether, acetonitrile, formamide, nitromethane, or the like. Heating is useful in accelerating the reaction, temperatures of 50° to 125° C. being generally suitable. The product is obtained as a residue, which may be purified by stripping, extraction, or similar operation, if desired.

Dimethyl- and diethyl-aminobutynols are available through the reaction of dimethyl- or diethyl-aminopropyne and formaldehyde under the influence of a copper catalyst. Cf. page 80, of "Acetylene Chemistry" by J. W. Reppe, translation published by C. A. Meyer & Co., Inc., New York, 1949.

Alkylbenzyl halides are available through halomethylation of alkylbenzenes or alkylmethylbenzenes in which the alkyl group varies from eight or preferably nine carbon atoms to about 16 carbon atoms. The alkyl group can be straight or branched. Particularly useful alkyl groups are obtained from propylene polymers, fractions of which give groups predominantly of 9, 12, or 15 carbon atoms. The alkyl group may also be derived from a close-cut kerosene fraction, one having a content of about 14 carbon atoms being particularly useful.

Useful starting materials are alkylated benzenes, toluenes, and xylenes which include n-octylbenzene, n-octyltoluene, n-octylxylenes, 2-ethylhexylbenzene, 1-methylheptyltoluene, (1,3-dimethyl-1-propylbutyl)benzene, (3,5,5-trimethylhexyl)benzene, (3,5,5-trimethylhexyl)toluene, (3,5,5-trimethylhexyl)xylene, nonyltoluene (the nonyl group being from propylene trimer), decylbenzene, n-dodecylbenzene, dodecyltoluene (the dodecyl group being from propylene tetramer), tetradecylbenzene, tetradecyltoluene, tetradecyldimethylbenzene, pentadecylbenzene, hexadecylbenzene, etc. These are halomethylated with a hydrogen halide and formaldehyde or paraformaldehyde or with the equivalent conveniently in the presence of such a catalyst as zinc chloride in glacial acetic acid. There are thus obtained the chloromethyl or bromomethyl derivatives of the alkyl benzenes, including the toluene and xylene derivatives.

The preparation of the compounds of this invention is further illustrated by the following examples, in which parts are by weight.

Example 1

There were mixed 22.6 parts of 4-dimethylamino-2-butyne-1-ol, 58 parts of octylbenzyl chloride, and 120 parts of dry benzene. The mixture was stirred and heated under reflux for an hour. Solvent was evaporated and the residue stripped by heating to 100° C./10 mm. The residue was a glassy mass which corresponded in composition to octylbenzyl dimethyl 4-hydroxy-2-butynyl ammonium chloride. This compound had a phenol coefficient of about 75 against *Staphylococcus aureus* and *Salmonella typhosa*. It gave 100% inhibition of germination of spores of *Sclerotinia fructicola* and *Macrosporium sarcinaeforme* at 0.005% dilution. It was not phytotoxic to green plants treated with a 0.1% solution thereof. The product has good solubility in water and other solvents.

Example 2

There were mixed 14.1 parts of 4-diethylamino-2-butyne-1-ol, 31.1 parts of (3,5,5-trimethylhexyl)methylbenzyl bromide, and 100 parts of acetonitrile. The mixture was stirred and heated under reflux for seven hours. The solvent was driven off by heating under low pressure to yield a solid, which was hygroscopic and which corresponded in composition to nonylmethylbenzyl diethyl 4-hydroxy-2-butynyl ammonium bromide. It has a phenol coefficient of 275 against *Staphylococcus aureus* and 255 against *Salmonella typhosa*.

Example 3

A solution of 34 parts of 4-dimethylamino-2-butyne-1-ol in 80 parts of dry toluene was treated with 97 parts of 5-dodecyl-2-methylbenzyl chloride. The mixture was stirred and heated to 60° C., whereupon an exothermal reaction took place. The mixture was heated under reflux for an hour and allowed to stand overnight. Petroleum ether was added and the solid product precipitated. It was separated and extracted with petroleum ether several times. Traces of solvent were removed under low pressure to give an almost quantitative yield of dodecylmethylbenzyl dimethyl 4-hydroxy-2-butynyl ammonium chloride, a soft, hygroscopic solid. This has a phenol coefficient of 310 against *Salmonella typhosa* and of 570 against *Staphylococcus aureus*. In fungitoxicity tests against *Sclerotinia fructicola* and *Macrosporium sarcinaeforme* it inhibited all germination of spores even at a dilution of 0.0005%. A 0.1% solution was not phytotoxic to green plants even though other quaternary ammonium salts were phytotoxic at much lower concentrations.

Example 4

There were mixed 67 parts of pentadecylbenzyl chloride (the pentadecyl group being obtained from a cup of propylene polymer), 22.6 parts of 4-dimethylamino-2-butyne-1-ol, and 100 parts of toluene. The mixture was stirred and heated under reflux for two hours and left standing overnight. The solvent was evaporated under reduced pressure. The residue was extracted with petroleum ether and heated under reduced pressure to give an unctious solid which corresponded in composition to $$C_{15}H_{31}C_6H_4CH_2(CH_3)_2(HOCH_2C{\equiv}CCH_2)NCl$$

Titratable nitrogen is nil; chlorine content is 7.9% (theory 7.88%). The phenol coefficient is 530 against *Staphylococcus aureus* and 345 against *Salmonella typhosa*. It gives 100% inhibition of germination of the above test fungi at a concentration of 0.001% and less. It is non-phytotoxic to green plants when tested at 0.1%.

In place of a pentadecylbenzyl halide there may be used hexadecylbenzyl chloride or bromide. The quaternary salt formed is a soft, waxy solid which has fairly good solubility in water and is a powerful bactericide and fungicide. Other alkylbenzyl groups may be introduced in the same way. When the alkyl group contains 8 to 16 carbon atoms, the compounds obtained are surface active and highly effective against many types of bacteria and fungi.

While in the above preparations the anion Z is chlorine or bromine, since the reaction involved is that between a dialkylaminobutynol and an alkylbenzyl halide, the halide may be replaced through metathesis with other salt-forming anion, such as sulfate, thiocyanate, acetate, phenate, and the like. In another known way of converting the halide salt to other salt the halide may be acted upon with a hydroxide or alkoxide to displace the halide and there can then be formed the desired salt by neutralization with an acid.

We claim:

1. As new chemical substances, compounds of the formula

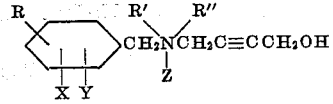

wherein R is an alkyl group of eight to sixteen carbon atoms, X and Y are members of the class consisting of hydrogen and the methyl group, R' and R'' are alkyl groups of not over two carbon atoms, and Z is a salt-forming anion.

2. As new chemical substances, compounds of the formula

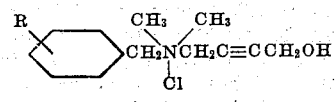

wherein R is an alkyl group of nine to sixteen carbon atoms.

3. As new chemical substances, compounds of the formula

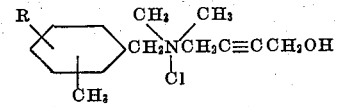

wherein R is an alkyl group of nine to sixteen carbon atoms.

4. As a new chemical compound, nonylbenzyl dimethyl 4-hydroxy-2-butynyl ammonium chloride.

5. As a new chemical compound, dodecylbenzyl dimethyl 4-hydroxy-2-butynyl ammonium chloride.

6. As a new chemical compound, pentadecylbenzyl dimethyl 4-hydroxy-2-butynyl ammonium chloride.

7. As a new chemical compound, nonylmethylbenzyl dimethyl 4-hydroxy-2-butynyl ammonium chloride.

WILLARD J. CROXALL.
SIDNEY MELAMED.

No references cited.